April 7, 1942.   J. KORIZON   2,278,884
TERRAZZO MOLD
Filed Jan. 2, 1940
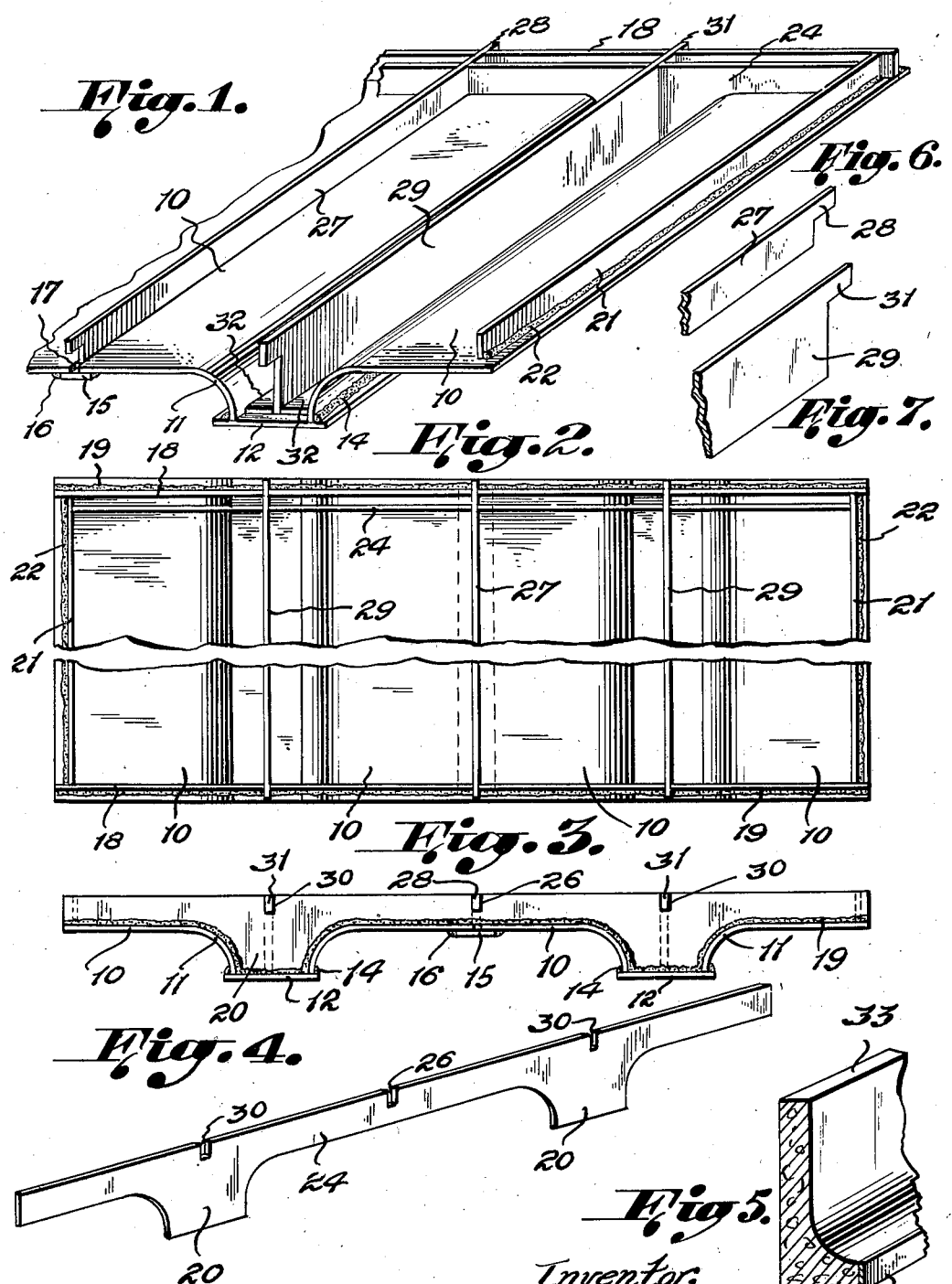
Inventor,
John Korizon
By: Glascock Downing & Seebold Attys.

Patented Apr. 7, 1942

2,278,884

UNITED STATES PATENT OFFICE 2,278,884

TERRAZZO MOLD

John Korizon, Atlanta, Ga.

Application January 2, 1940, Serial No. 312,115

2 Claims. (Cl. 25—121)

The present invention relates to means for manufacturing tile and more particularly pertains to a mold adapted for casting terrazzo base members.

An object of the invention resides in providing a form or mold in which the base members may be precast and in the desired shape so as to be ready for use in building construction.

Another object of the invention resides in providing a mold wherein the cast base members may be readily removed without destroying parts of the mold or injuring the base members during the removal thereof from the mold.

The mold is also adapted to be used in a tile forming machine such as disclosed in Patent No. 1,560,999 granted November 10, 1925. In other words, the mold hereinafter described may be arranged in such a machine so that the desired jarring and shaking movements may be imparted to the mold during the casting of the base members.

Other features and objects of the invention will be more apparent to those skilled in the art upon a consideration of the accompanying drawing and the following description wherein an exemplary embodiment of the invention is disclosed.

In the drawing:

Fig. 1 is a perspective view of part of the mold with one of the end walls removed so as to illustrate the details of the mold.

Fig. 2 is a top plan view of the complete mold.

Fig. 3 is an end elevational view of the mold shown in Fig. 2.

Fig. 4 is a perspective view of a transverse partition.

Fig. 5 is a sectional perspective view of a terrazzo base member cast in the mold.

Fig. 6 is a perspective view showing the end portion of one of the removable longitudinal partitions of the mold.

Fig. 7 is a perspective view of the end portion of another of the removable partitions.

Referring to the drawing there is shown at 10 a plurality of sheets which form the bottom portion of the mold. The plates 10 may be formed of any suitable material such as sixteen gauge sheet steel and these bottom members of the mold are curved as indicated at 11 so as to impart the proper curvature to the finished terrazzo base members.

The bottom members are connected by means of flat plates 12 formed of rolled steel approximately ¼ inch in thickness and the plates may be joined to the base members 10 adjacent the curved portions thereof by welding as indicated at 14 in Figs. 1 and 3. The flat under surfaces of the plates 12 thus provide means for supporting the mold on any suitable base such as the platen of a tile forming machine disclosed in the above mentioned patent.

The mold is preferably arranged to permit the casting of a plurality of similar shaped base members in one molding operation. The straight portions of the bottom members 10 are thus joined by a plate 15 as shown in Figs. 1 and 3. The plate 15 is preferably welded along the edges thereof adjacent the straight portions of the base members 10 as indicated at 16. The adjacent edges of the bottom members adjacent the plate 15 are preferably spaced so as to provide a groove 17 within which one of the removable partitions may be inserted as hereinafter described.

The end portions of the mold are provided with suitably shaped wall members 18 which may each be formed of one piece of material and each end wall is preferably welded to the respective bottom members 10 as indicated by the welded metal 19 in Figs. 2 and 3. The end wall members are provided with downwardly depending portions 20 suitably curved to fit the curved portions 11 of the bottom members. The depending portions 20 of the end walls 18 are also welded to the plates 12 as illustrated in Fig. 3.

The lateral extremities of the mold are defined by plates 21 which are permanently secured to the associated bottom members 10 and the end walls 18. The plates 21 may also be regarded as side walls and are attached to the respective bottom members by means of welded metal 22 as shown particularly in Figs. 1 and 2.

The mold or form is provided with a plurality of removable partitions for the purposes of defining the ends and side dimensions for the terrazzo base member having a cross-sectional shape such as illustrated in Fig. 5. The removable partitions are also arranged in such a manner that the terrazzo base members may be removed without difficulty. Thus a partition 24 having the shape as illustrated in Fig. 4 is arranged in the mold along one of the end walls 18 and spaced therefrom as shown in Fig. 2. The removable transverse partition 24 is provided with projections 20 corresponding in shape to those of the end walls 18. In other respects the removable partition 24 is similar in shape to that of the end walls 18.

The removable partition 24 and the end walls 18 are provided with slots or recesses 26 for the purpose of receiving tongues of the other removable partitions so as to properly position these longitudinally extending removable partitions. One of the longitudinal partitions is illustrated at 27 in Figs. 1, 2 and 6. This partition is adapted to fit with the lower edge thereof within the groove 17 provided between the spaced ends of the bottom members 10 adjacent the plate 15. The height of the removable partition 27 is such as to be aligned with the top edge of the end walls 18. The end portions of the partition 27 are provided with tongues 28 adapted to be arranged within the slots 26 of the end walls 18 and the removable transverse partition 24.

Additional removable plates are provided for being arranged within the mold between the curved portions 11 of the bottom members 10. These removable partitions 29 are of such height that the upper edges thereof are aligned with top edges of the end walls 18 and the side walls 21. The longitudinally extending partitions 29 are likewise provided with tongues 31 adapted to extend into recesses 30 of the end walls 18 and the transverse partition 24.

In molding the terrazzo base members it is desirable to provide a metal strip along the vertical edge portion which is to be joined with the floor and for this purpose a brass strip 32 is first arranged along each side of the longitudinal partitions 29 as shown in Fig. 1 so as to rest upon the plate 12. These strips 32 also hold the lower portion of the partitions 29 in proper position in relation to the curved portions 11 of the bottom members. Thus when the terrazzo base is cast within the mold the metal strip 32 will be arranged along the vertical edge of the terrazzo base member as illustrated in Fig. 5.

With the metal strips 32 arranged in the mold adjacent the longitudinal partitions 29 and with the removable partitions 27 and 29 arranged in a manner as illustrated in Fig. 2 the molding of the terrazzo base members may be carried out. The material forming the base members may thus be filled into the mold and after the base members have set the terrazzo base members may be removed from the mold without injury by first removing the transverse partition 24. As hereinabove described this partition is spaced from an end wall 18 and the purpose of thus spacing the removable partition 24 is for permitting removal thereof so that the molded terrazzo base members will not be injured in removing the molded material from the form. During the molding operation the form may be arranged in apparatus such as disclosed in Patent No. 1,560,999 dated November 10, 1925, for the purpose of properly jarring and treating the contents of the mold.

Thus the mold or form will produce the finished terrazzo base members as shown in Fig. 5. These base members may therefore be completely precast and delivered to a building ready to be installed. No grinding or polishing is necessary to complete the base members. These base members provide a number of advantages in building construction in that it is not necessary to provide any metal ground between the plaster and the terrazzo base. The top edge 33 is also finished during the molding operation and the plaster can be arranged along this top edge 33 and no baseboard or patching of the plaster is necessary with the use of the terrazzo base members formed in the mold hereinabove described. The top edge 33 of the terrazzo base members can also be employed to provide the plastering line for the walls of a building.

While the invention has been described with reference to specific structural details it is apparent that changes may be made therein. Such modifications may be made without departing from the spirit and scope of the invention as set forth in the appended claims.

I claim:

1. In a mold for casting terrazzo base members, a plurality of bottom members having downwardly curved portions and substantially straight portions, said bottom members being arranged with the curved portions adjacent each other and a straight portion of one bottom member arranged adjacent a straight portion of another bottom member, means for securing said adjacent straight portions of the bottom members to each other in a spaced relation to provide a groove between the edges thereof, plates connecting the curved portions of the bottom members, end walls for said bottom members, and a removable partition extending longitudinally of the mold with the lower edge thereof within said groove.

2. In a mold for casting terrazzo base members, a plurality of bottom members having downwardly curved portions and substantially straight portions, said bottom members being arranged with the curved portions adjacent each other and a straight portion of one bottom member arranged adjacent a straight portion of another bottom member, means for securing said adjacent straight portions of the bottom members to each other in a spaced relation to provide a groove between the edges thereof, plates connecting the curved portions of the bottom members, end walls for said bottom members, a removable partition extending longitudinally of the mold with the lower edge thereof within said groove, said end walls each having a slot therein, and tongues carried by said partition extending through said slots.

JOHN KORIZON.